United States Patent [19]

Edwards

[11] Patent Number: 4,819,105
[45] Date of Patent: Apr. 4, 1989

[54] SPACER FOR DISKS IN A DISK DRIVE

[76] Inventor: William J. Edwards, 1404 N. McMillan, Oklahoma City, Okla. 73127

[21] Appl. No.: 112,198

[22] Filed: Oct. 26, 1987

[51] Int. Cl.$^4$ .............................................. G11B 5/016
[52] U.S. Cl. .................................. 360/98.08; 360/133
[58] Field of Search .................................... 360/97–99, 360/133

[56] References Cited

U.S. PATENT DOCUMENTS 4,707,752  11/1987  Gyi ........................................ 360/99

FOREIGN PATENT DOCUMENTS 3010236   9/1980  Fed. Rep. of Germany ........ 360/98
53-125815 11/1978 Japan ..................................... 360/98
60-79577   5/1985  Japan ..................................... 360/98
60-261091 12/1985 Japan ..................................... 360/97

Primary Examiner—John H. Wolff
Assistant Examiner—Matthew J. Bussan
Attorney, Agent, or Firm—Robert K. Rhea

[57] ABSTRACT

A spacer for separating disks in a disk drive having a plurality of superposed disks surrounding a hub comprising a sheet material ring channel-shaped in cross section having radial and circumferentially spaced apertures for providing transverse fluid communication through the spacer.

9 Claims, 2 Drawing Sheets

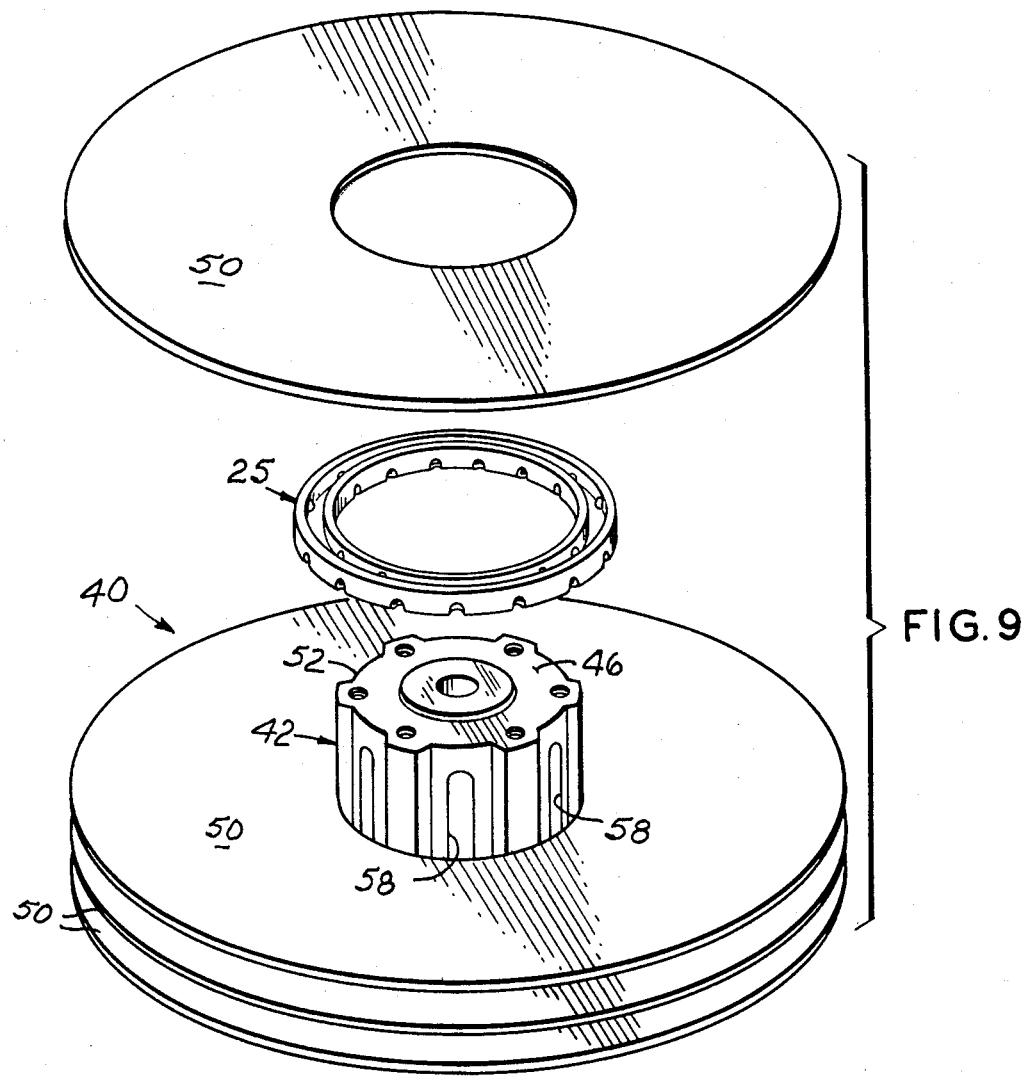
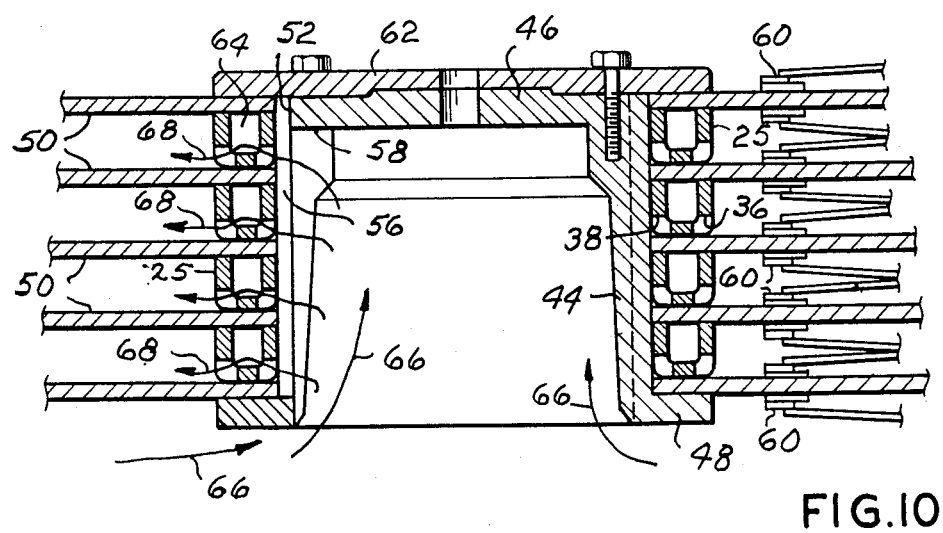

SPACER FOR DISKS IN A DISK DRIVE

BACKGROUND OF THE INVENTION

1. Field of the invention

The present invention relates to disk drives and more particularly to a spacer interposed between disks in a disk drive.

It is presently common practice to electronically store data on magnetic disks for processing and retrieving such data as desired. One form of such data storage device is commonly referred to as a "hard disk drive" which basically comprises a series of superposed disks in which the opposing flat surfaces thereof receive and store the data. The data is accessed by "heads" from respective surfaces of the several disks. The disks surround a driven hub which angularly rotates the several disks in unison. The angular rotation of the disk generates an air stream across the surfaces of the disks which helps in preventing dust particles or other contaminants from adhering to the magnetic disk.

This invention provides a light weight spacer for the disks of a hard disk drive which also allows air flow across the face of the several disks.

2. Description of the Prior Art

Spacers for disks in a hard disk drive have generally comprised a ring which cooperatively surrounds the driving hub of a disk drive and is interposed between adjacent disks.

Spacers presently used have generally been manufactured by die casting; fine blanking; wrought or extruded bar stock; or, sintered powdered aluminum.

At least two prior art ring spacers feature a series of circumferentially spaced recesses or indentations in its opposing surfaces which accommodates air flow across the position of the spacer and the adjacent surface of the respective disk. The resulting voids in the spacer surfaces tend to distort the inner peripheral edge portion of the disk when the several desks and spacers are fastened to the hub by a hub cap, or the like, impinging the disk and spacers.

Other prior art disk spacers are not provided with voids or recesses. Additionally, the solid, in cross section, configuration of prior art disk spacers adds to the rotational mass of the disk drive and may also contribute to the unbalanced forces on the drive spindle or hub. The coefficient of thermal expansion of most prior spacers does not match the relatively thin material forming the disks.

The disk spacer of this invention is formed from sheet material resulting in a relatively low mass. Further, the spacer of this invention is provided with apertures which permit air flow through the spacer whether mounted on a disk drive hub.

SUMMARY OF THE INVENTION

A sheet material ring, channel or U-shaped in transverse section, closely surrounds the hub of a disk drive and is interposed between adjacent disks surrounding the hub to maintain the disks in parallel spaced relation. The U-shape of the spacer is characterized by a flat bight surface flatly contacting the surface of the inner peripheral edge portion of one disk with the legs of the U-shape extending equidistant in parallel relation from the bight portion to contact the surface of the inner peripheral edge portion of the other disk. The spacer is provided with a pair of radial circumferentially spaced rows of apertures through the wall of the spacer at the juncture of the U-shape legs with the bight portion for forming air pass ageways through the spacer.

The principal objects of this invention are: to provide a formed sheet material spacer for separating disks in a disk drive; a reduction of drive starting and stopping inertia forces by a reduction of the spacer mass; reducing the unbalanced forces on the drive hub or spindle by a reduction of the spindle mass with a subsequent reduction in the dynamic balance requirements; forming a cooperative thermal coefficient of expansion between disk and spacer materials; providing air passageways through the spacer; providing a disk spacer which may be more economically manufactured; and, including a void within the spacer itself for containing air filtering material.

BRIEF DESCRIPTION OF THE DRAWINGS

FIG. 9 is a fragmentary perspective view illustrating the relative position of the preferred spacer and a disk drive;

FIG. 10 is a fragmentary vertical cross sectional view, to a larger scale, through the hub portion of a disk drive with parts removed for clarity and diagrammatically illustrating the air flow permitted by the spacers of this invention;

DESCRIPTION OF THE PREFERRED EMBODIMENTS

Figure 1:
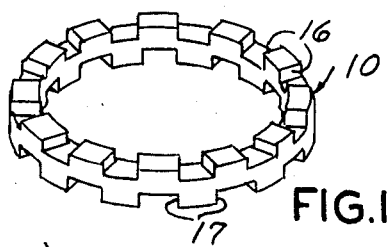
FIGS. 1, 2 and 3 are perspective views of prior art disk spacers.
Figure 2:
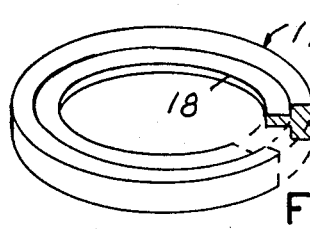
Figure 3:
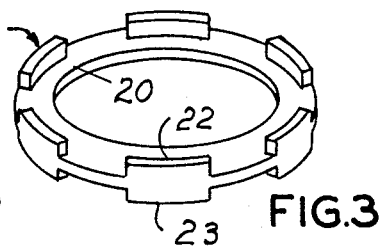

Like characters of reference designate like parts in those figures of the drawings in which they occur.

In the drawings:

The reference numerals 10, 12 and 14 indicate three prior art disk spacers. The spacer 10 is generally rectangular in transverse section and is characterized by a circumferentially spaced series of indentations or recesses 16 and 17, forming air flow passageways, in its opposing top and bottom surfaces, as viewed in FIG. 1, the recess 16 being circumferentially staggered or offset from the recesses 17.

The spacer 12 is similarly solid rectangular in transverse section but is further characterized by a flat ring 18 secured to its inner periphery midway the vertical thickness of the outer ring to reduce the mass of the spacer but without providing air flow passageways across the spacer when interposed between disks.

The spacer 14 principally comprises a horizontally disposed flat ring 20 having a series of upstanding and depending vertically aligned arcuate lugs 22 and 23 extending through a selected arc of the ring periphery in circumferential equally spaced relation providing similarly spaced voids or openings therebetween. The recesses 16 and 17 of the spacer 14, accommodates air flow across the position of the spacer when interposed between a pair of disks.

While these disks 10, 12 and 14 will operate as intended, they are not entirely satisfactory for the reasons mentioned hereinabove.

The reference numeral 25 indicates a preferred disk spacer which is preferably formed from sheet metal in a manner hereinafter described. The spacer is substantially channel or U-shaped in transverse section having a pair of parallel legs 26 and 28 normal to its bight portion 30, the plane of the bight portion 30 being parallel with the plane defined by the edge surface 32 of the legs.

Figure 8:
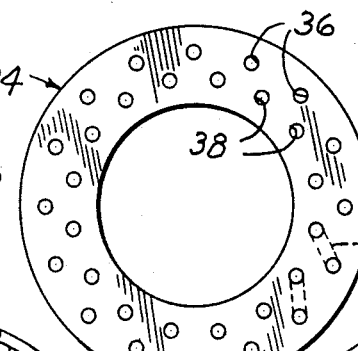
FIG. 8 is a pattern view of sheet material for forming the disk of FIG. 4.
Figure 4:
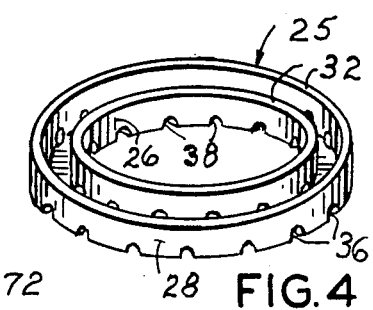
FIG. 4 is a perspective view of the spacer of the present invention.
Figure 6:
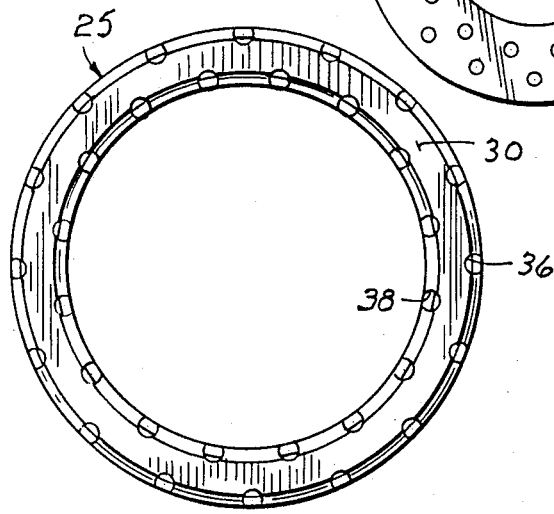
FIG. 6 is a bottom view of the spacer shown in FIG. 9.
Figure 5:
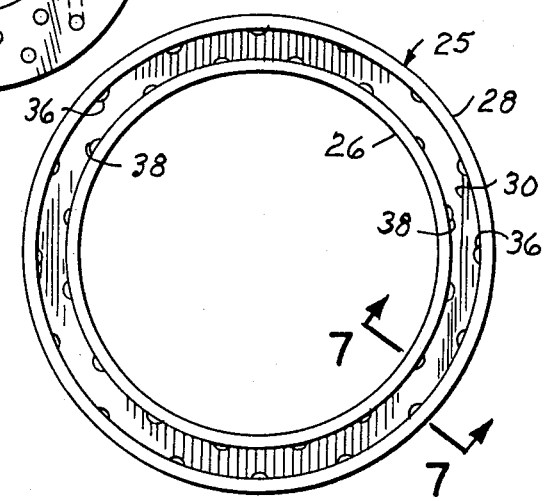
FIG. 5 is a top view, to an enlarged scale, of the spacer of FIG. 4.

As illustrated in the pattern view of FIG. 8, sheet material is punched to define a flat ring 34 of predetermined outside and inside diameter. Intermediate its width, the ring 34 is provided with a pair of concentric radially spaced rows of apertures 36 and 38 with the apertures in each row being equally spaced circumferentially. The apertures of one row being circumferentially staggered with respect to the apertures in the other row. The radial spacing between the rows of apertures 36 and 38 being substantially equal to the transverse width of the U-shaped bight portion 30. The concentric circles defined by the rows of apertures 36 and 38 form bend lines for a punch or die, neither being shown, to bend the outer and inner peripheral edge portions of the ring 34 in a cooperating direction to define the U-shape legs 26 and 28.

It seems obvious that the spacer 25 may be formed without the apertures 36 and 38 to provide an economical light weight spacer.

The disk drive 40, a portion of which is illustrated by FIGS. 9 and 10, includes a generally cylindrical spindle or hub 42. The hub is characterized by an annular wall 44 and an integral top wall 46 at its upper end, as viewed in the drawings. An outstanding flange 48, at the depending limit of the wall 44, forms an annular shoulder for supporting the lowermost one of a superposed series of disks 50 surrounding the hub. One of the spacers 25 surrounds the hub 42 between adjacent disks. The hub wall 44 is further provided with a series of circumferentially spaced-apart longitudinally coextensive recesses 52 forming an air space 56 between the periphery of the hub and the inner periphery of the respective disks and the several spacers 25 for the purposes presently explained. Further, the hub wall 44 is provided with a like plurality of vertically elongated slots 58 extending downwardly from its upper wall 46 and centrally disposed with respect to the width of the recesses 52 for the purpose of permitting air flow through the hub wall.

The length of the hub 42 is selected in accordance with the number of disks and spacers it is desired to support, the spacing between adjacent disks 50 being such that a pair of read/write heads 60 may be positioned between adjacent disks as is conventional. The vertical height of the U-shape of the spacer 25 must equal this predetermined dimension. Similarly, the inside dimension of the spacer 25 must be cooperatively received by the periphery of the hub 42 and the outside diameter surface, formed by the opposite leg of the spacer U-shape, must be disposed inwardly of the limit of movement of the heads 60 toward the axis of the hub 42. When the disks 50 are assembled on the hub 42, with one of the spacers 25 between each two adjacent disks 50, a hub cap 62 overlies the topmost disk and impinges the several disks and spacers against the shoulder formed by the hub wall flange 48.

A motor, not shown, angularly rotates the hub and disk assembly which generates an air flow toward the hub interior in the direction of the arrows 66. The air passes outward through the hub wall and through the spacer apertures 36–38 and across the adjacent surfaces of the respective disks in the direction of the arrows 68.

Figure 11:
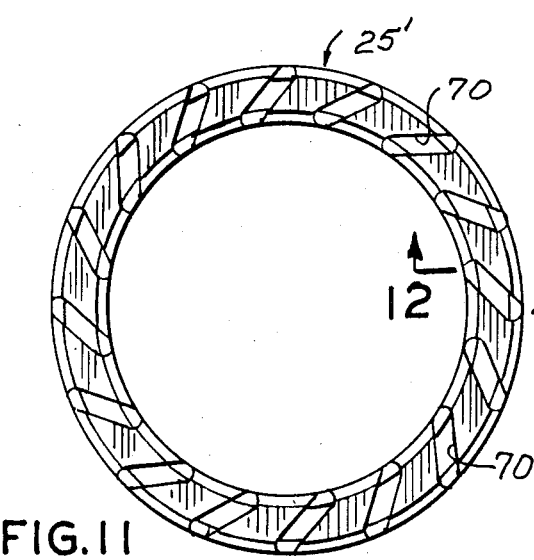
FIG. 11 is a bottom view of an alternative embodiment of the spacer.
Figure 12:
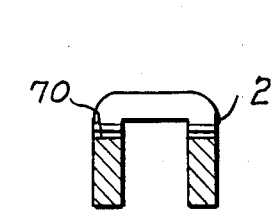
FIG. 12 is a vertical cross section, to a larger scale, taken substantially along the line 12—12 of FIG. 11; and, FIGS. 13 and 14 are vertical cross sectional views, similar to FIG. 7, illustrating other embodiments of the spacer.
Figure 7:
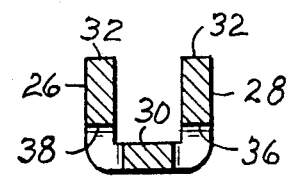
FIG. 7 is a vertical cross section, to a larger scale, taken substantially along the line 7—7 of FIG. 5.

The numeral 25' (FIG. 11) indicates another embodiment of the spacer in which slots 70 are formed in the sheet material extending between adjacent apertures 36 and 38. The position of the slots is shown by the dotted lines 72 (FIG. 8) which may be formed at the time of preparing the punched ring 34, prior to forming the U-shape, or may be cut therein following forming the U-shape configuration. These slots 70 permit a greater volume air passageway across the position of the spacer than the apertures 36 and 38.

Figure 13:
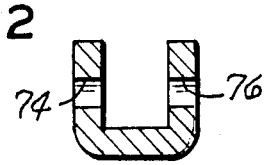
Figure 14:
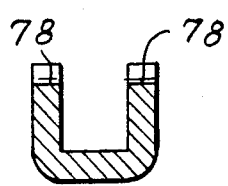

Alternatively, the spacer may be provided with apertures 74 and 76 extending transversely through the respective U-shaped leg 26 and 28 intermediate the height of the legs, as illustrated by FIG. 13. Additionally, arcuate or semicircular recesses 78 may be formed in the edge surface 32 of the respective U-shape leg (FIG. 14) to provide air flow across the position of the spacers 36 and 38 in contact with an adjacent disk.

Obviously the invention is susceptible to changes or alterations without defeating its practicability. Therefore, I do not wish to be confined to the preferred embodiment shown in the drawings and described herein.

I claim:

1. In a disk drive having a plurality of spaced disks surrounding a driven hub for angularly rotating the disks as a unit, the improvement comprising:
   spacer means including a ring, U-shaped in cross section in the radial direction, surrounding the hub and interposed between adjacent disks,
   the U-shape of said ring being defined by a substantially planar bight portion and parallel legs extending equidistant from respective lateral limits of the bight portion and further including a row of circumferentially spaced-apart apertures at the intersection of the respective leg of the U-shape with the bight portion for forming a series of transverse fluid passageways through the ring.

2. The combination according to claim 1 in which the apertures of one said row of apertures at the intersection of the bight portion and one leg of the U-shape are circumferentially staggered with respect to the row of apertures at the intersection of the bight portion and the other leg of the U-shape.

3. In a disk drive having a plurality of spaced disks surrounding a driven hub for angularly rotating the disks as a unit, the improvement comprising:
   spacer means including a ring, U-shaped in cross section in the radial direction, surrounding the hub and interposed between adjacent disks,
   said ring having a bight portion and having a series of circumferentially spaced coextensive transverse slots forming fluid passageways through its bight portion.

4. In a disk drive having a plurality of spaced disks surrounding a driven hub for angularly rotating the disks as a unit, the improvement comprising:

spacer means including a ring, U-shaped in cross section, in the radial direction, surrounding the hub and interposed between adjacent disks, the ring U-shape including a pair of legs extending from a bight portion and having a series of circumferentially spaced transverse recesses for forming transverse fluid passageways in the edge surface of the legs opposite the bight portion.

5. A spacer for insertion between adjacent disks in a disk drive, comprising:

a ring substantially defining a U-shape in transverse cross section in the radial direction having a planar bight portion and parallel legs, said bight portion contacting the adjacent surface of one said disk and said legs contacting the adjacent surface of the other said disk.

6. The spacer according to claim 5 in which the ring includes:

a circumferential row of spaced-apart apertures with each aperture intersecting an edge portion of the bight portion and a portion of one leg of the parallel legs for providing fluid communication between the interior and exterior of the ring.

7. The spacer according to claim 5 in which the ring includes:

a pair of concentric rows of circumferentially spaced-apart apertures in said ring adjacent the juncture of the legs of the U-shape with its bight portion.

8. The spacer according to claim 7 in which the apertures in one row of said pair of rows are staggered with respect to the apertures in the other row of said pair of rows of apertures.

9. The spacer according to claim 7 in which the bight portion of said U-shaped ring is provided with a series of transverse slots extending between and communicating with adjacent apertures of the respective row of said pair of rows of apertures.

* * * * *